United States Patent
McAninch et al.

(10) Patent No.: US 6,348,226 B1
(45) Date of Patent: Feb. 19, 2002

(54) METHOD FOR BLEACHING TRIPE USING LIQUID BLEACHING AGENTS

(76) Inventors: Terry L. McAninch, 7380 Jay St., Westminster, CO (US) 80003; Frederick W. Holzhauer, 282 Dahlia Dr., Louisville, CO (US) 80027

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/112,720

(22) Filed: Jul. 9, 1998

(51) Int. Cl.[7] ................................................ A22C 17/16
(52) U.S. Cl. ........................ 426/261; 426/253; 426/539; 252/186.1; 252/186.43
(58) Field of Search ........................ 252/186.21, 186.22, 252/186.23, 186.1, 186.38, 186.41, 186.42, 186.43; 426/539, 253, 257, 258, 261

(56) References Cited

U.S. PATENT DOCUMENTS

| | | | | | |
|---|---|---|---|---|---|
| RE16,116 E | * | 2/1925 | Sutherland | .................... | 99/107 |
| 1,539,201 A | * | 5/1925 | Sutherland | .................... | 99/107 |
| 1,631,903 A | * | 6/1927 | Van der Lande et al. | ..... | 99/107 |
| 1,682,803 A | * | 10/1928 | Stoddard et al. | ............. | 99/107 |
| 1,687,804 A | * | 10/1928 | Stoddard et al. | ............. | 99/107 |
| 1,722,501 A | * | 7/1929 | Kokatnur | .................... | 99/107 |
| 1,750,657 A | * | 3/1930 | Adolph et al. | ................ | 99/107 |
| 1,754,914 A | * | 4/1930 | Stoddard | .................... | 99/107 |
| 2,288,410 A | * | 6/1942 | Lippman | .................... | 252/186 |
| 2,448,252 A | * | 8/1948 | Cornthwaite et al. | ........ | 260/502 |
| 2,673,804 A | * | 3/1954 | Paddock | ...................... | 99/159 |
| 2,966,415 A | * | 12/1960 | Rinehart et al. | .............. | 99/175 |
| 3,025,166 A | * | 3/1962 | Smith | .......................... | 99/107 |
| 3,227,655 A | * | 1/1966 | Prett et al. | .................. | 252/186 |
| 3,475,179 A | * | 10/1969 | Smith | .......................... | 99/107 |
| 3,846,869 A | * | 11/1974 | Barbee | ......................... | 17/43 |
| 3,958,304 A | * | 5/1976 | Barbee | ......................... | 17/43 |
| 3,968,255 A | * | 7/1976 | Haas et al. | ................... | 426/33 |
| 3,970,575 A | * | 7/1976 | Barrett, Jr. | ................... | 252/95 |
| 4,051,058 A | * | 9/1977 | Böwing et al. | ............. | 252/186 |
| 4,772,290 A | * | 9/1988 | Mitchell et al. | ............... | 8/107 |
| 5,328,706 A | * | 7/1994 | Endico | ........................ | 426/231 |
| 5,437,883 A | * | 8/1995 | He | ............................. | 426/254 |
| 5,451,346 A | * | 9/1995 | Amou et al. | ........... | 252/186.23 |
| 5,545,374 A | * | 8/1996 | French et al. | ................. | 422/28 |
| 5,639,348 A | * | 6/1997 | Payton et al. | ................. | 162/26 |
| 5,733,474 A | * | 3/1998 | Kagermeier et al. | ... | 252/186.25 |
| 5,879,584 A | * | 3/1999 | Bianchetti et al. | ..... | 252/186.23 |
| 5,928,074 A | * | 7/1999 | Schrader et al. | ............ | 452/173 |

* cited by examiner

Primary Examiner—Cynthia L. Nessler
(74) Attorney, Agent, or Firm—Merchant & Gould P.C.; Thomas H. Young

(57) ABSTRACT

A tripe bleaching composition facilitating the economical processing of tripe comprising:

| | |
|---|---|
| Peracid precursor | 7.5–14% by wt. |
| Hydrogen Peroxide | 9.0–46% by wt. |
| Water | balance. |

The peracid precursor may be at least one member selected from the group consisting of tartaric, malic, maleic and acetic acid, with tartaric or malic acid being particularly preferred.

16 Claims, No Drawings

METHOD FOR BLEACHING TRIPE USING LIQUID BLEACHING AGENTS

I. TECHNICAL FIELD OF THE INVENTION

The invention relates to an improved method for bleaching tripe economically. In particular, the method of the present invention employs certain peracid compositions as tripe bleaching or whitening agents. These compositions are applied using aqueous mixtures of peracid precursor and hydrogen peroxide, thereby permitting automation of tripe preparation in a continuous process.

II. BACKGROUND OF THE INVENTION

The profitability of a meat packing plant is highly dependent on the ability of the plant to process all of the animal carcass into saleable products. Indeed, the very viability of the plant depends on the overall effectiveness to process portions, such as hides, tallow, and blood, into by-products that can be sold at a profit. This includes the economical processing of edible tissue, such as tripe, into consumable products.

Commercial meat packing plants prepare tripe by first cutting out the stomach of the slaughtered animal and removing the contents. The stomach may be pre-washed with cold water. A number of such stomachs are then washed in a centrifuge with water at approximately 140–170° F. The washed stomachs are then conveyed to a "refiner" where the bleaching chemicals are added. Typically, this device holds about twice as many stomachs as the washing device. In the refiner the product is cleaned by centrifuging in the presence of tripe washing chemicals. The cleaned product is chemically bleached and then neutralized to bring the pH down. The stomachs are then rinsed again and packaged for sale.

A number of materials have been used as tripe bleaching agents. U.S. Pat. No. 3,025,166 shows the use of alkaline materials in the processing of tripe. U.S. Pat. No. 3,475,179 teaches the use of citric, tartaric or lactic acid to produce a neutral pH after initial washing with an alkaline detergent and subsequent bleaching and washing. Potassium silicate is also used currently as a tripe wash. The industry currently uses hydrogen peroxide in 35% concentrated solution. However, hydrogen peroxide does not work particularly well as a cleaner. It only bleaches and does not serve either to clean or neutralize. This is likely due to the fact that hydrogen peroxide is not a detergent; its molecules are too small, and it is highly polar. Accordingly, it does not make contact very well with the tripe.

Multi-step batch processes for washing tripe are not very efficient. Typically, it takes two men to run a washer and a refiner. These personnel add the chemical washing and bleaching agents and monitor the process, e.g., cycle times and water levels. Although attempts have been made to automate the tripe washing process in recent years, to date no fully automated method has been found to successfully accomplish this. Meat packers have attempted to install automated, continuous processes for treating tripe that are more efficient and safer. Theoretically, the manpower required for treating could be cut in half with an automated system. Unfortunately such systems have not been successful, due in part to the fact that typical tripe washing and bleaching agents are solids. Under the hot and humid conditions of a meat packing plant, the powders tend to cake, thereby clogging the dispensing equipment, and resulting in interruption of the tripe washing and bleaching processes as the dispensing equipment is tended to. Moreover, the handling of such solid washing and bleaching agents entails significant safety problems for the workers involved.

For these and other reasons, there has been considerable interest in liquid chemicals for use in tripe processing. If an effective liquid bleaching agent could be found it would enable the use of continuous tripe processing which would be both efficient and safer. The present invention comprises a liquid bleaching agent that demonstrates surprisingly good results and an improved tripe washing process.

III. SUMMARY OF THE INVENTION

The present invention is based on the discovery that a combination of certain peracid precursors and aqueous hydrogen peroxide is an effective bleaching agent for tripe. Tartaric and malic acids are the presently preferred peracid precursors.

Preferably the peracid precursor and aqueous hydrogen peroxide are pre-mixed to form a liquid that can be applied effectively in either batch or continuous processes. Accordingly, the bleaching agents can be used in automated processes; the safety of dealing with the bleaching agents is also improved in that there is less chemical handling and potential for burns. The bleaching compositions of the present invention also facilitate washing of the tripe and result in a more pH neutral product. Other advantages are evident from the detailed description and examples described herein.

IV. DETAILED DESCRIPTION OF THE INVENTION

We have discovered that an effective tripe bleaching composition can be prepared comprising:

| | |
|---|---|
| Peracid precursor | 7.5–14% by wt. |
| Hydrogen Peroxide | 9.0–46% by wt. |
| Water | balance |

These percentages for the ingredients are approximate bearing in mind that there are slight variances in the molecular weights of the peracid precursors employed and that bleaching efficacy can be influenced by other factors such as the prior processing of the tripe, time and temperature of the bleaching application, the quantity of bleach applied, etc. Preferably, the peracid precursor is present in an amount of approximately 9 to 12% by weight of the bleaching composition. In general, larger amounts of hydrogen peroxide are preferred. Preferably, hydrogen peroxide is present in an amount of approximately 43% by weight—corresponding to the upper limit allowed by U.S. Department of Transportation regulations.

The peracid precursors may be selected from the group consisting of tartaric, malic, maleic and acetic acids. Of these, tartaric and malic are preferred in part because of their relative solubility, efficacy and cost as well as the other reasons mentioned herein. Malic acid may be especially preferred, particularly when, as at present, it is substantially less expensive than tartaric acid. Acetic acid, while efficacious, is not as useful because of a strong acrid, sour odor associated with its use. The odors associated with acetic acid can also be an allergen for certain people. Other peracid precursors (e.g., citric and lactic acid) are very unstable, and some (e.g., fumaric and succinic acids) have a low solubility rendering them unattractive candidates for commercial use. Formic acid also has significant odor and toxicity problems and, in addition, undergoes an exothermic reaction with aqueous hydrogen peroxide, all of which make it an unsuitable candidate.

Blends of these peracid precursors, i.e., tartaric, malic, maleic and acetic acids, may also be used. A preferred blend comprises tartaric and malic acid precursors.

Preferably, the hydrogen peroxide and peracid precursor are present in a mole ratio of about 0.5–20. This ratio ensures the optimum balance of bleaching performance and economics, utilizing the current cost of raw materials. This optimum is also defined by current permissible shipping limits in the United States. The preferred mole ratio is in the portion of this range above 1% and even more preferably in the portion of the range of 15% or more.

Peroxide is employed in 50% $H_2O_2$ aqueous solution, i.e., the maximum concentration of food grade hydrogen peroxide currently available commercially.

The tripe bleaching compositions of the present invention can be used at various stages in the processing of tripe into a saleable product. Preferably, they are added after the tripe has been washed, which improves the contacting of the bleach with the tripe. Washing can be accomplished with water typically at approximately 140° F. for about 4 to 6 minutes. Even more preferably, the bleaching agents of the present invention are added after the washed tripe is cleaned. Typical cleaners include Tripe Wash HV™, Brillo™ and Bruto™ available from Bruto™available from Birko Corporation in Henderson, Col.

Although the ingredients could be mixed on site, on-site blending increases the labor costs of the meat processing operator and increases the possibility of accident or injury resulting from the additional handling requirements. Accordingly, pre-blending of the raw materials into a finished composition is preferred. Such a procedure is also desirable because it provides consistency in the concentration of the bleaching agent applied to the tripe. In that regard, it is desirable that the bleaching compositions of the present invention be uniformly applied or contacted with the tripe in terms of time, weight and loading. Hot spots can result unless dispensing of the bleach with the tripe is uniform and precise.

The tripe bleaching composition of the present invention should be employed in a dosage of approximately ¼ to 1 full gallon of blended bleaching composition per 30 tripe, i.e., approximately 300 lbs. The dosage may vary depending on the concentration of the bleach and the bleaching result desired, i.e., the degree of whiteness.

Normally, the bleaching compositions of the present invention will be employed at a temperature of approximately, 120–130° F. when using conventional (i.e., cylinder) equipment and at a temperature of approximately 120–150° F., when using centrifugal equipment. The amount of bleaching agent required to achieve a particular result is reduced as the temperature is increased. The bleaching composition should contact the tripe for not less than five minutes and up to about 7 minutes at lower temperatures, when using conventional equipment, and for about 2 to 5 minutes when using centrifugal equipment.

A number of advantages can be achieved with the tripe bleaching compositions and processes of the present invention. As noted previously, because the compositions are liquids, they can be applied in batch or continuous processes and are suitable for use in automated processes thereby reducing cost for the meat processing plant and improving the safety for workers.

Also, the compositions of the present invention particularly that utilizing tartaric and malic acid, are particularly effective tripe bleaching agents. While not wishing to be bound by any theory of operation, it appears that the long molecules of resulting peracid act like a blanket on the surface of the tripe. The peracid also acts to bring the oxygen group in better contact with the tripe for purposes of bleaching.

The compositions of the present invention employing tartaric and malic acid as the peracid precursor have been found to be surprisingly stable. Indeed, these compositions appear to be among the most stable peracid compositions known. One of the reasons for this is the compositions using tartaric and malic acids results in endothermic reactions producing peracids in racemic mixtures with various isomers. Because of the surprising stability of these compositions, they can be pre-blended and shipped and handled more easily and safely than other peracid compositions.

The tartaric and malic acid compositions of the present invention are particularly suitable in food processing. Tartaric acid itself is commercially derived from natural materials, e.g., grapes and malic acid is commercially derived from apples. Although tartaric acid is relatively expensive, the tartaric acid compositions of the present invention work very well for bleaching tripe. Because the tartaric acid compositions are relatively stable, they do not require peracid stabilizers like other peracid compositions. Frequently these stabilizers are not acceptable in food and food processing environments. The tartaric acid compositions also do not have an offensive odor like other peracid compositions. Tripe bleaching with tartaric acid compositions produces a product with a pH of 7–8. This is desirable, since bleaching processes that produce tripe with a pH greater than 10, most likely will result in unsalable product, since the tripe will be black and mushy when cooked.

V. EXAMPLES

Tripe bleaching compositions of the present invention were identified and tested on washed tripe. In each case, 30 tripe were placed in a centrifugal refiner and washed either with "Tripe Wash HV™," "Bruto™," or "Brillo™," i.e., commercial tripe washes available under those trademarks from the Birko Corporation of Henderson, Col. The indicated amount of liquid bleaching agent was then added at an initial temperature of 130° F. and an exit temperature of approximately 125° F. The pH of the tripe was then measured at indicated portions of the washing process and at the time of dumping. An initial intermediate pH of approximately 12.8 to 13 is preferred and a final pH near neutral are preferred.

Example 1

A bleaching composition was prepared containing 45% by weight of hydrogen peroxide, 10% by weight tartaric acid and the balance water. Approximately 1 gallon of Bruto™ was added to 30 tripe which were then centrifuged with a resulting pH of approximately 13.0 after 3 minutes. The bleaching composition was then added resulting in a pH of about 11.2 and centrifuging continued for an additional 4 minutes resulting in cleaned and bleached tripe having a pH of approximately 9.5. The cleaned and bleached tripe were of good quality with a clean white appearance and a high yield, i.e., material with a firm feel, good weight and preferably no evidence of physical or chemical deterioration.

Example 2

A bleaching composition was prepared containing 38.5% by weight of hydrogen peroxide, 10% by weight tartaric acid and the balance water. Sixteen to twenty pieces of tripe were washed in water at 146° F. for 5 minutes. The washed tripe were then placed in a refiner and contacted with ¾ gallon of Bruto™ at 145° F. for 1–2 minutes. One gallon of the bleaching composition was then added and the tripe were centrifuged for 5–10 minutes. The bleached tripe were then centrifuged in the refiner with hot water for 2–3 minutes as a hot rinse and then treated for an equivalent amount of time with a cold water rinse. The product was clean and white but the yield was starting to deteriorate, i.e., there was some physical/chemical deterioration.

Example 3

A field test was performed on tripe bleaching compositions employing three different peracid precursors: tartaric, malic and maleic. In each case the bleaching composition comprised 37.5% by weight of hydrogen peroxide, 10% by weight of peracid precursor and the balance was water.

Tartaric peracid: Approximately 30 pieces of tripe were washed in water at 142° F. for 5 minutes. The washed tripe were then placed in a refiner and contacted with ½ gallon of Brillo™ for approximately 5 minutes with a resulting pH of 12.0. Approximately ½ gallon of the tartaric acid bleach was then added, and the tripe were centrifuged for approximately 5 minutes with a final pH of 10.0. The bleached tripe were then centrifuged with 125–130° F. water for several minutes. The tripe were significantly cleaned, but not completely. The test was repeated, but the tripe were bleached with the tartaric peracid bleaching composition for 7 minutes. The results were the same. The test indicated that satisfactory bleaching could be obtained using slightly more bleaching agent.

Malic peracid: Approximately 30 pieces of tripe were washed in water at 142° F. for 5 minutes. The washed tripe were then placed in a refiner and contacted with 2/3 gallon of Brillo™ cleaner for approximately 5 minutes with a resulting pH of 12.0. Approximately ⅔ gallon of the malic acid bleach was then added, and the tripe were centrifuged for approximately 7 minutes with a resulting pH of 9.0. The bleached tripe were then centrifuged with 125–130° F. water for several minutes. The resulting tripe were satisfactorily bleached. The same test was repeated with the same results.

Malic peracid: Approximately 30 pieces of tripe were washed in water at 142° F. for 5 minutes. The washed tripe were then placed in a refiner and contacted with ½ gallon of Brillo™ cleaner for approximately 5 minutes with a resulting pH of 12.0. Approximately ⅔ gallon of the maleic acid bleach was then added, and the tripe were centrifuged for approximately 7 minutes with a resulting pH of 9.0. The bleached tripe were then centrifuged with 125–130° F. water for several minutes. The resulting tripe were not adequately bleached, but the initial results were close. It was apparent that adequate bleaching could be achieved by adjusting the quantity of peracid and/or the bleaching times.

Example 4

A tripe bleaching composition according to the present invention was prepared using 12% by wt. of acetic acid precursor, 37.5% hydrogen peroxide and the balance water. The composition was stable and demonstrated tripe bleaching activity when applied in a laboratory environment.

It should be noted that the invention has been described in detail with reference to particular embodiments thereof, but it will be understood that various other modifications can be effected within the spirit and scope of this invention and the claims which follow.

We claim:

1. A method of efficiently washing and bleaching tripe comprising contacting said tripe for approximately 2 to 12 minutes with an effective bleaching amount of a composition comprising:

| Peracid precursor | 7.5–14% by wt. |
| Hydrogen Peroxide | 9.0–46% by wt. |
| Water | balance, | said composition being applied at a temperature of approximately 120–150° F.

2. The method of claim 1 wherein the peracid precursor is at least one member selected from the group consisting of tartaric, malic, maleic and acetic acid precursors.

3. The method of claim 1, wherein the peracid precursor is tartaric acid precursor.

4. The method of claim 1, wherein the peracid precursor is malic acid precursor.

5. The method of claim 1, wherein the peracid precursor is maleic acid precursor.

6. The method of claim 2, wherein the mole ratio of hydrogen peroxide to peracid precursor is in the range of 0.5 to 20.

7. The method of claim 6, wherein the tripe bleaching composition is applied in an amount from approximately ¼ to 1 gallon of said composition per 300 lbs. of tripe.

8. The method of claim 2, wherein the mole ratio of hydrogen peroxide to peracid precursor is in the range of 15 to 20.

9. The method of claim 8, wherein the tripe bleaching composition is applied in an amount from approximately ¼ to 1 gallon of said composition per 300 lbs. of tripe.

10. The method of claim 1 wherein the contacting includes the automated dispensing of the tripe bleaching composition in liquid form.

11. The method of claim 10 wherein the tripe bleaching composition is applied in an amount from approximately ¼ to 1 gallon of said composition per 300 lbs. of tripe.

12. The method of claim 11 wherein the peracid precursor is at least one member selected from the group consisting of tartaric, malic, maleic and acetic acid precursors.

13. The method of claim 11, wherein the peracid precursor is tartaric acid precursor.

14. The method of claim 11, wherein the peracid precursor is malic acid precursor.

15. The method of claim 11, wherein the peracid precursor is maleic acid precursor.

16. The method of claim 12, wherein the mole ratio of hydrogen peroxide to peracid precursor is in the range of 0.5 to 20.

* * * * *